United States Patent [19]
Pollock et al.

[11] Patent Number: 6,105,422
[45] Date of Patent: Aug. 22, 2000

[54] BRAKE TESTER AND METHOD OF USING SAME

[76] Inventors: Paul Pollock, 5828 Alcot Pl., Fort Wayne, Ind. 46815; William Odisho, 1308 Chanterelle St., Fort Wayne, Ind. 46845; Richard Joslin, 4006 San Pedro Dr., Fort Wyane, Ind. 46815; Jim Sheets, 10716 Marion Center Rd., Fort Wayne, Ind. 48616

[21] Appl. No.: 09/114,487

[22] Filed: Jul. 13, 1998

[51] Int. Cl.⁷ ....................................................... G01L 5/28
[52] U.S. Cl. ................................................ 73/121; 73/129
[58] Field of Search ................ 73/121, 129; 188/1.11 L, 188/1.11 E, 1.11

[56] References Cited

U.S. PATENT DOCUMENTS

| | | |
|---|---|---|
| 4,182,981 | 1/1980 | Shum et al. . |
| 4,924,172 | 5/1990 | Holmgren . |
| 5,038,605 | 8/1991 | Tews et al. ................................. 73/129 |
| 5,339,069 | 8/1994 | Penner et al. ........................... 188/1.11 |
| 5,372,221 | 12/1994 | Jalbert ..................................... 188/1.11 |
| 5,497,101 | 3/1996 | Fillion . |
| 5,632,359 | 5/1997 | Camps et al. . |

*Primary Examiner*—Max Noori
*Assistant Examiner*—Maurice Stevens
*Attorney, Agent, or Firm*—Liniak, Berenato Longacre & White

[57] ABSTRACT

A brake tester which is capable of mapping the position of the brake shoe in its extended position. The tester includes a plurality of sensors which are mounted about the brake assembly. The sensors are capable of measuring the distance between the sensor and the brake shoe. In the preferred embodiment, laser sensors are rotated about the brake assembly while the brake shoe is fully extended. The sensed signal is recorded and compiled to generate a mapping of the brake shoe. Alternatively, a plurality of stationary capacitive proximity sensors are disposed about the brake shoe generating a distance signal indicative of the distance between the brake shoe and a simulated drum surface. Such mapping tests for accurate displacement of the brake shoe can predict premature shoe wear and particular wear zones. A secondary function maps the entire surface of the brake shoe lining/friction pad when initial contact is made with the drum surface using the laser sensor.

11 Claims, 7 Drawing Sheets

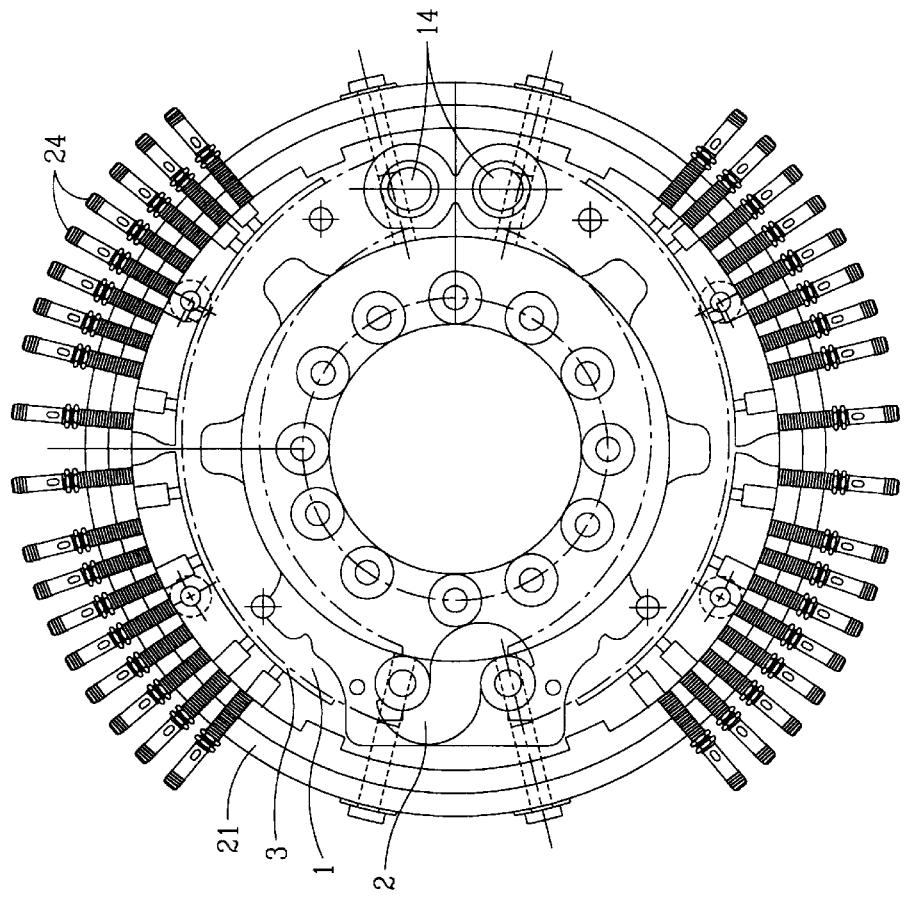
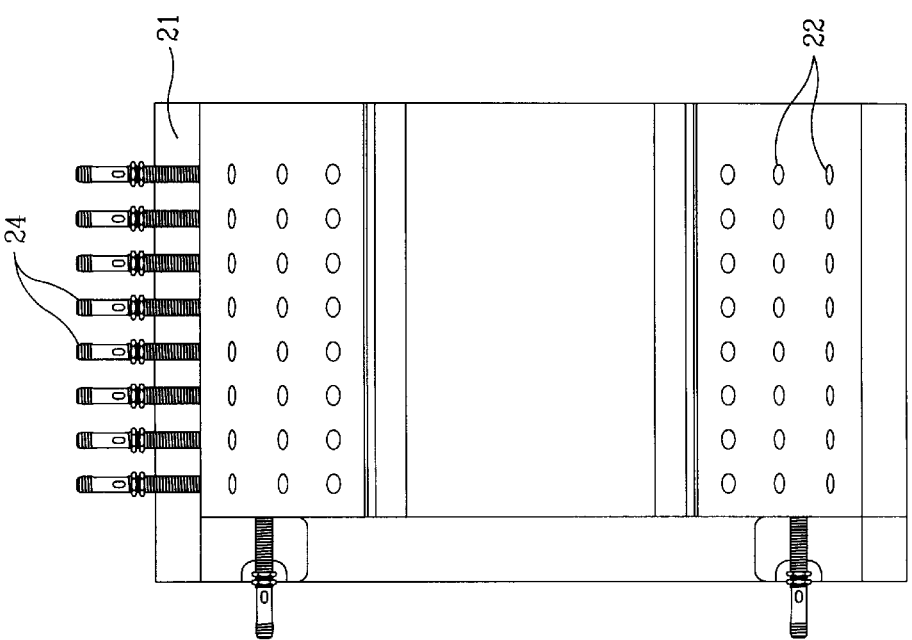

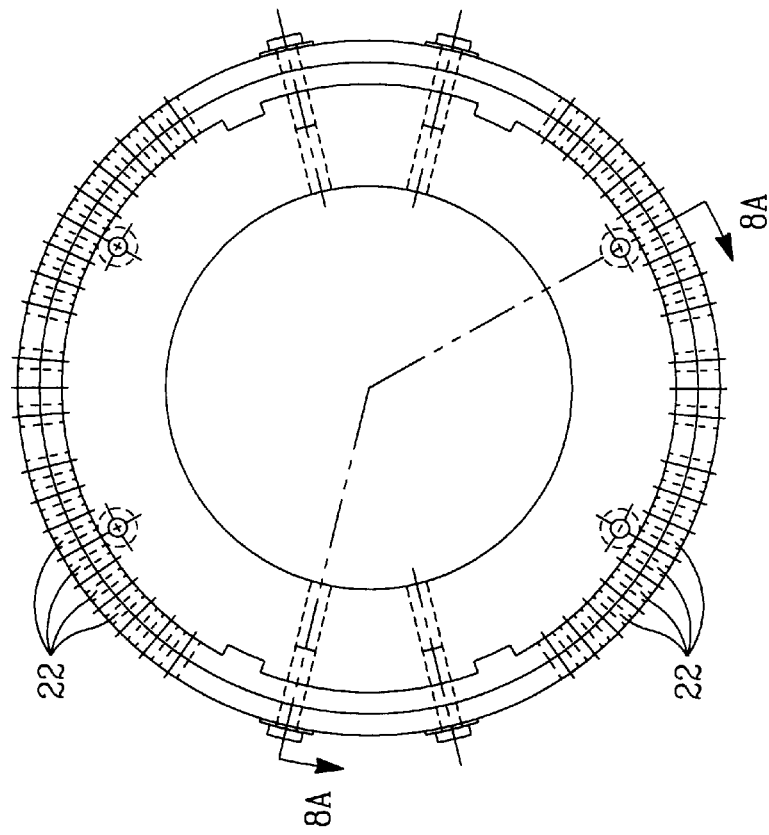
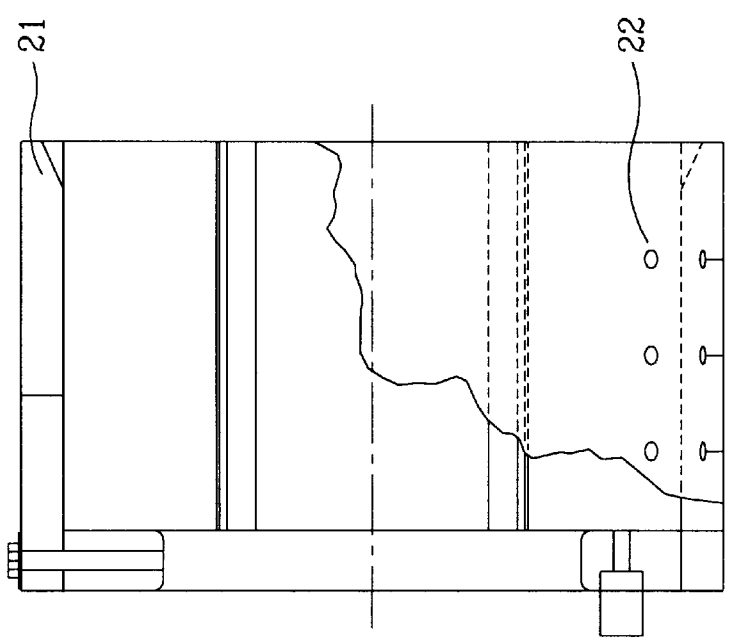

BRAKE TESTER AND METHOD OF USING SAME

BACKGROUND OF THE INVENTION

1. Field of the Invention

This invention is directed to a brake tester and particularly is directed to a sensor assembly for mapping the position of a brake shoe and specifically for mapping the contact surface between a brake shoe lining/friction pad and a drum surface.

2. Description of the Prior Art

Numerous brake testers exist within the prior art. Many of these brake testers simply involve a sensor embedded within a brake pad which, when worn away due to progressing pad wear, opens a circuit to produce a signal indicating that the brake pads need replacement.

U.S. Pat. No. 5,632,359 to Camps, et al. discloses a capacitive sensor to detect excessive wear of a brake pad in a disk brake assembly and is incorporated herein by reference. U.S. Pat. No. 4,182981 to Shum, et al.; U.S. Pat. No. 4,924,172 to Holmgren; and U.S. Pat. No. 5,497101 to Fillion, each disclose capacitive distance measuring devices in non brake related arts and are incorporated herein by reference. Various other non relevant brake testers exist in the prior art.

Heretofore, the brake testing art has not disclosed or suggested a testing device to map the position of a brake shoe and the contact surface of the brake lining.

SUMMARY OF THE INVENTION

The present invention is directed to a brake tester which is capable of mapping the contact surface of the brake shoe lining with a drum surface. The tester includes a plurality of sensors which are mounted about the brake assembly. The sensors are capable of measuring the distance between the sensor and the brake shoe or detecting the presence of the brake lining within a predetermined range. In the preferred embodiment laser sensors are rotated about the brake assembly while brake shoe is in its extended position. In a second embodiment a plurality of capacitive proximity sensors are positioned at discrete positions about the brake shoe assembly. The sensed signals are recorded and compiled to generate a mapping of the surface lining of the brake shoe when the brake shoe is extended. Such mapping tests for accurate displacement of the brake shoe and can predict premature wear and particular wear zones. A secondary function maps the entire surface of the brake shoe lining/friction pad when initial contact is made with the drum surface using laser sensors.

BRIEF DESCRIPTION OF THE INVENTION

FIG. 5 is a sectional view of a brake tester according to an alternate embodiment of the present invention.

FIG. 6 is side view of the brake tester of FIG. 5 mounted to a brake shoe assembly.

FIG. 8A is a partial sectional view taken along line 8A—8A of FIG. 8B.

FIG. 8B is a side view of the sensor mounting sleeve of FIGS. 5 & 6.

DESCRIPTION OF THE PREFERRED EMBODIMENT

Figure 1:
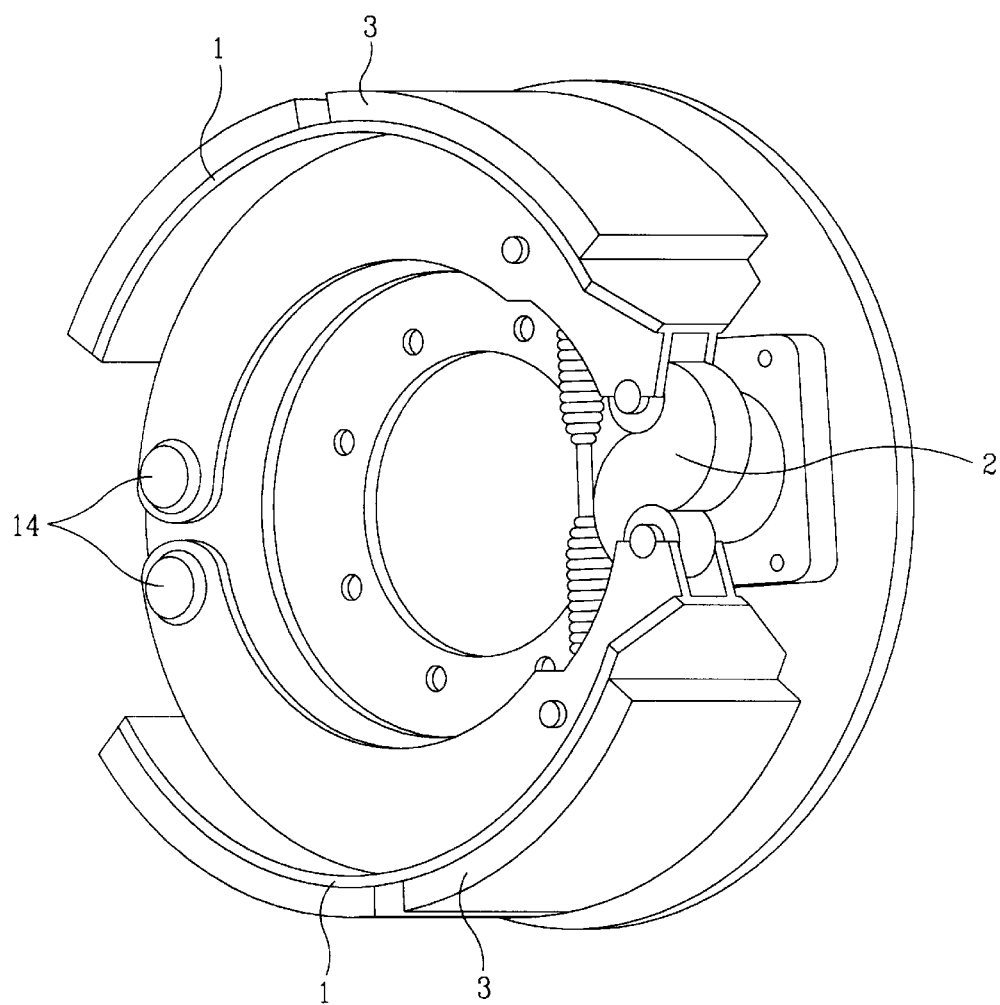
FIG. 1 is perspective view of a conventional brake shoe assembly of the prior art.

FIG. 1 represents a conventional brake shoe assembly. The brake shoes are displaced by rotating S-cam 2. The brake shoes 1 and friction pads 3 simply rotate about pivot pins 14.

In order to measure the position of the brake shoes 1 and friction pads 3, a plurality of sensors 4 are mounted about the brake shoe assembly.

Figure 2:
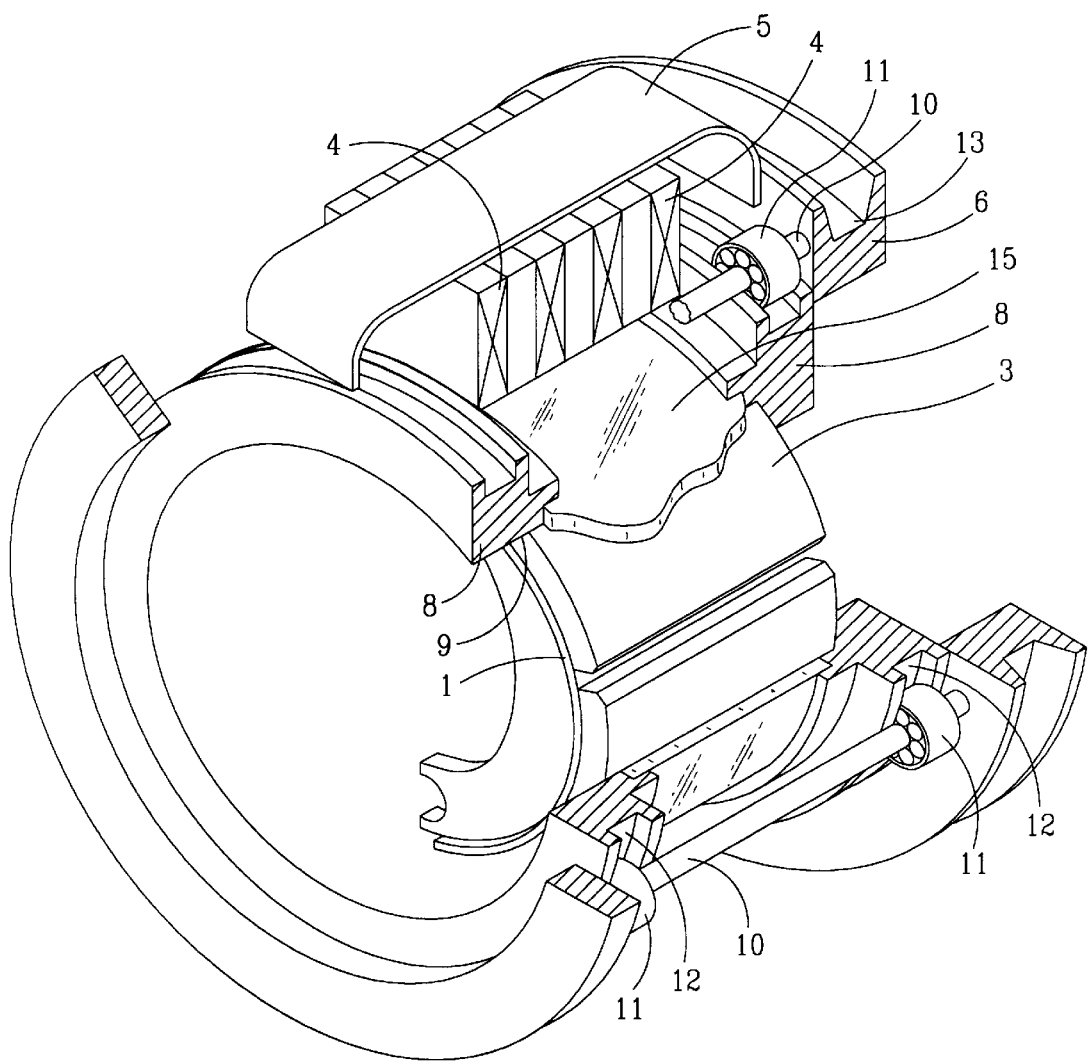
FIG. 2 is a perspective view of the preferred embodiment of the brake tester mounted to a brake shoe assembly.
Figure 3:
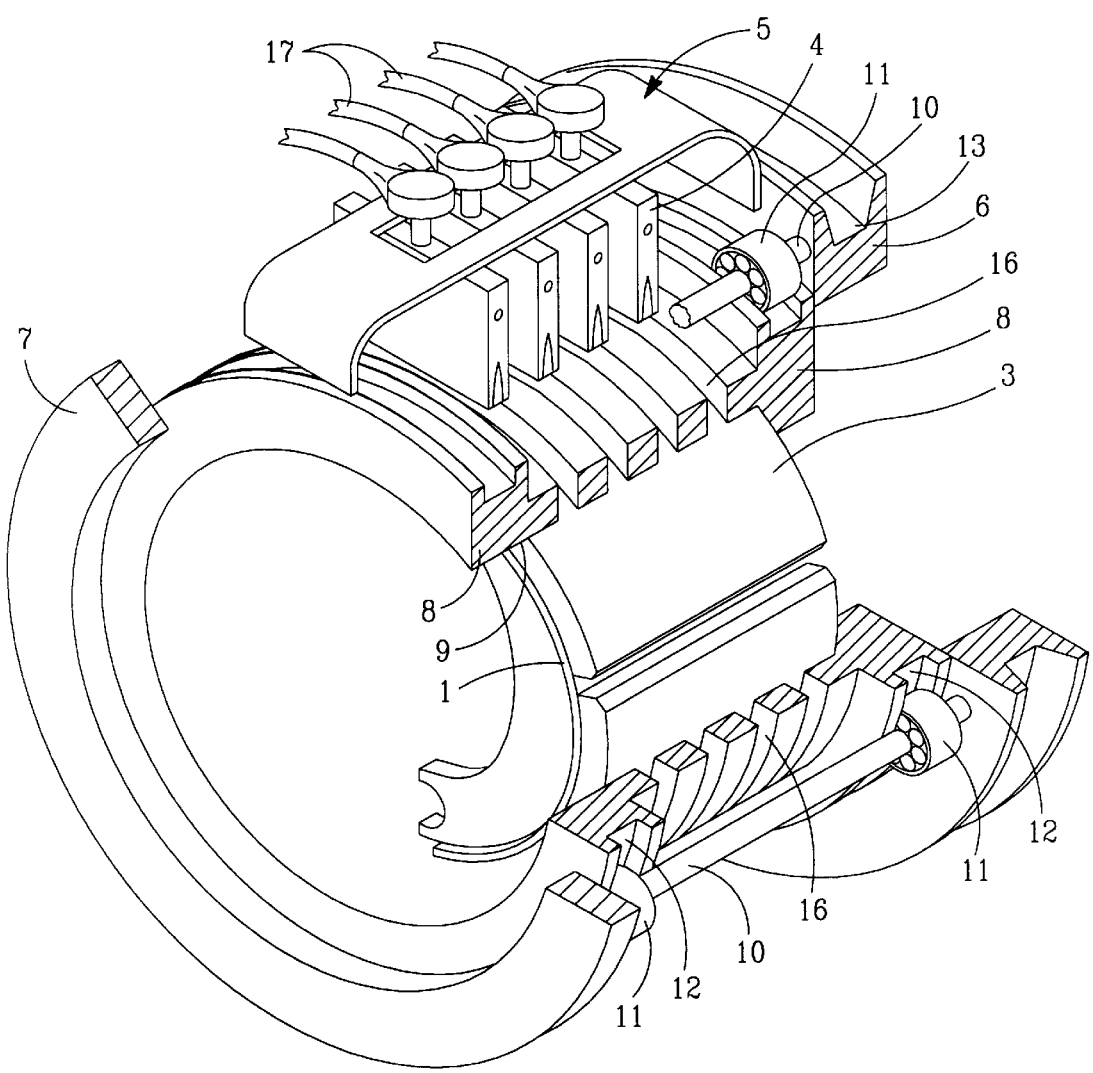
FIG. 3 is a perspective view of an alternate embodiment of the instant invention.

In the preferred embodiments of FIG. 2 and 3, a plurality of laser sensors 4, longitudinally spaced apart, are rotatably mounted about the brake shoe assembly. Laser sensors 4 are affixed to a bracket 5. Bracket 5 is in turn secured to a bearing assembly. The bearing assembly includes first and second bearing rings 6 & 7 rotatably mounted about a sleeve 8. The bearing rings are connected to one another and spaced apart by bearing rods 10. Preferably three bearing rods are employed for structural integrity. A pair of bearings 11 are disposed on each bearing rod one each adjacent the first and second bearing rings 6 & 7. The bearings 11 are disposed in grooves 12 formed in the sleeve 8. The sensors 4 and bracket 5 may then rotate freely about sleeve 8.

Sleeve 8 is secured about the brake shoe assembly such that the internal surface simulates the internal surface of a brake drum which the friction pads 3 bear against. Thus the laser sensors 4 may then be freely rotated about the brake shoe assembly.

The sleeve 8 may be fastened to the wheel hub or spindle axle in any number of common ways found in the art. The front part of the sleeve may have a portion extending radially inwardly for attachment to the wheel hub via bolts, screws, clips etc.

The first bearing ring 6 is provided with a pulley groove 13 to accept a drive belt. The sensor assembly may then be controllably rotated about the brake shoe assembly by driving the drive belt. The drive belt and a pulley wheel to drive the drive belt are not specifically shown and are well known in the pulley drive art. Any number of pulley drive arrangements may be employed so long as the position and speed of the sensor assembly may be controlled.

FIG. 2 represents one of the preferred embodiments employing laser sensors. Many laser distance measuring devices are known in the distance measuring arts. In the preferred embodiment of FIG. 2, a plurality of laser distant measuring sensors 4 are disposed in the sensor assembly. A transparent portion 15 is formed in the sleeve 8 to allow light to transmit through the sleeve facilitating the measurement of the distance between the sensor and the friction pad 3. Preferably, the transparent portion 15 is formed of plexiglass. The transparent portion extends circumferentially to expose the friction pads 3 to the laser sensors 4.

In an alternate preferred embodiment, as depicted in FIG. 3, a plurality of circumferential slots are formed in the sleeve 8 to expose the friction pads 3 to the laser sensors 4.

Each of the sensors 4 of FIGS. 2 & 3 have lead wires leading to a processing unit where the signal representative of the distance between the sensor and the friction pad is processed and stored. The processor controls a drive controller which in turn controls a drive pulley to drive the first bearing gear and thus control the position and displacement of the brake tester about the brake shoe assembly.

Figure 4:
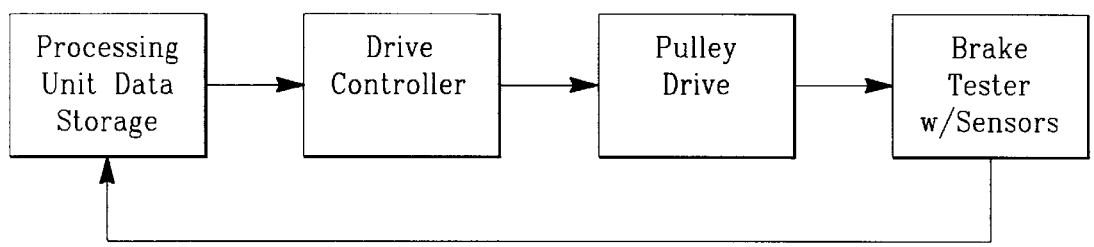
FIG. 4 is a schematic representation of the present invention.

The laser sensors sends distance signals back to the processing unit for processing and storage. FIG. 4 represents a schematic diagram of the complete testing device employing the tester of FIGS. 2–3

The method of testing the brake shoe assembly utilizing the tester of FIGS. 2–3 will now be discussed. The brake tester is concentrically mounted to the wheel spindle about the brake shoe assembly. The processing unit controls a drive controller which in turn controls a drive pulley to selectively drive the sensor assembly about the brake shoe assembly. The sensors are driven about the brake shoe when fully extended.

As the sensors are driven, they send a distance signal back to the processing units. Because the distance between the sensor and internal surface 9 of the sleeve 8 is known, and the relative position of where the brake drum lining will be positioned, the processing unit calculates the position of the brake shoe lining for a plurality of circumferential positions about the brake shoe lining. These measurements are taken for a plurality of radial positions after brake shoe extension. A simple algorithm can process the data to accumulate mapping data representative of brake shoe position and brake lining surface to identify contact points/surfaces between the brake lining and simulated drum surface 9.

Once the data is processed it can be analyzed for proper extension. Improper extension can and will lead to premature wear and other malfunctions. The wear of the brake pads can then be effectively predicted to ensure that the brake shoe assembly is working properly.

Figure 7:
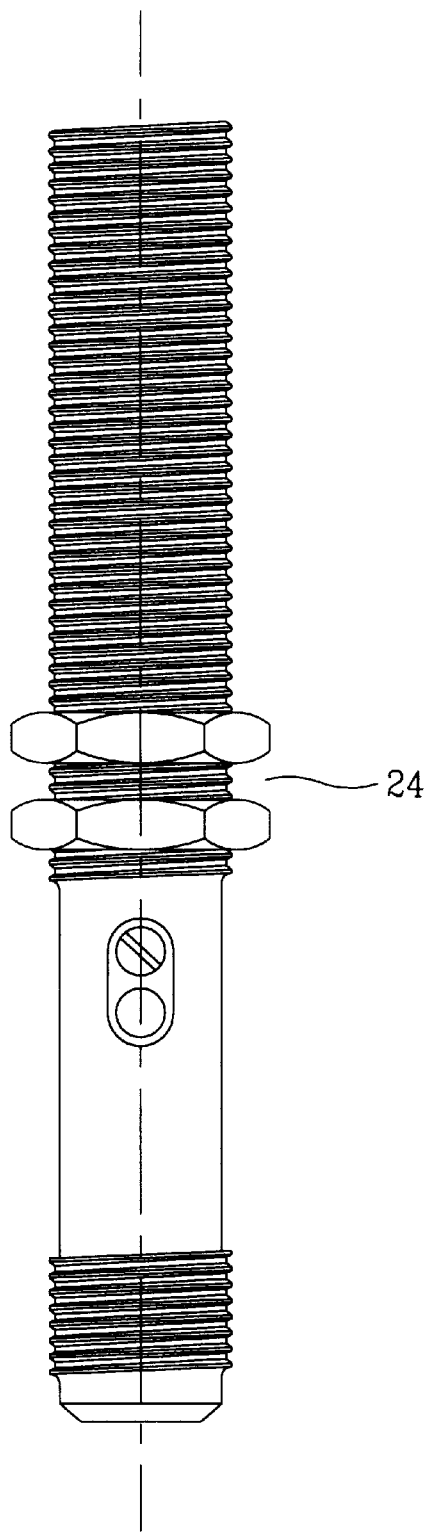
FIG. 7 is a view of a capacitive proximity sensor.

FIGS. 5–8 represent an alternate embodiment of the present invention. FIG. 5 depicts a sensor sleeve 21 having a plurality of capacitive proximity sensors 24 disposed at a plurality of discrete positions. Proximity sensors 24 are simply screwed into threaded bores 22. FIG. 7 shows a capacitive proximity sensor having threaded ends for threadingly engaging the threaded bores 22 of the sensor sleeve.

FIG. 6 depicts sensor sleeve 21 and numerous capacitive proximity sensors 24 concentrically disposed about a conventional brake shoe assembly. When the S-cam 2 is rotated, the brake shoes 1 and friction pads 3 pivot about pivot pins 14 extending from a retracted position to an extended position advancing towards the capacitive proximity sensors 24.

The inner peripheral surface of the sensor sleeve is designed to simulate the inner surface of a brake drum surface. Each of the capacitive proximity sensors 24 are attached to a central processing unit to record and process signals generated by the sensors 24 indicating the presence of the friction pad/brake lining. A plurality of capacitative proximity sensors 24 are disposed at discrete positions extending both in the axial and circumferential direction to cover a substantial area about the brake shoe. The more sensors employed, the more accurate and well defined the mapping.

The capacitive sensors are so arranged such that its measuring range coincides with the simulated drum surface 9. When the capacitive sensors indicate the presence of the friction pad there exists a contact point between the friction pad and drum surface. If the capacitive sensors do not detect the presence of the friction pad, no contact exists.

When the brake shoe is fully extended, each sensor generates a signal indicating the presence of the brake shoe. The signals are processed and compiled by the CPU by a simple algorithm to generate a map of the contact surface of the friction pads. The specific contact area between friction pad 3 and simulated drum surface 9 can then be identified.

The displacement of the brake shoes 1 and friction pads 3 may then be evaluated to ensure proper assembly and predict premature wear.

FIGS. 8A & 8B depict the sensor sleeve 21 with threaded bores 22 to receive the threaded end of the capacitive proximity sensor 24.

While the foregoing invention has been shown and described with reference to a preferred embodiment, it will be understood by those possessing skill in the art that various changes and modifications may be made without departing from the spirit and scope of the invention. For example, in an alternative embodiment, a plurality of sensors may be circumferentially disposed about the friction pad and the sensor assembly can be axially displaced back and forth as the brake shoe is extended.

We claim:

1. A brake tester for mapping a surface of a brake shoe in a drum brake assembly, said brake tester comprising:

a plurality of proximity sensors mounted on a sleeve disposed about said brake shoe to detect a contact point of said surface of said brake shoe against a simulated lining, said brake shoe extendable to an extended position, said plurality of proximity sensors forming a matrix of sensors defined by a plurality of sensors disposed along an axial direction and a plurality of sensors disposed along a circumferential direction of said sleeve covering an area substantially covering said brake shoe.

2. The brake tester according to claim 1, further comprising:

a mapping means for mapping each detected contact point when said brake shoe is in said extended position.

3. The brake tester according to claim 1, wherein said proximity sensors comprise capacitive proximity sensors, said proximity capacity sensors threadingly engaging a threaded bore extending through said sleeve.

4. The brake tester according to claim 1, wherein said proximity sensors comprise capacitive proximity sensors, said proximity capacity sensors threadingly engaging a threaded bore extending through said sleeve.

5. A brake tester for mapping a position of a brake shoe in a drum brake assembly, said brake tester comprising:

a sleeve mounted about said brake shoe, said sleeve having an internal surface, said brake shoe being displaceable from a retracted position spaced apart from said internal surface of said sleeve to an extended position adjacent said internal surface thereby simulating the displacement of said shoe toward and away from a brake drum;

a plurality of longitudinally aligned sensors rotatably mounted about said sleeve, said sensors adapted to generate a signal representative of a distance between said brake shoe and said internal surface of said sleeve, a drive means for circumferentially driving said sensors about said sleeve, wherein said sensors are driven about said sleeve when said brake shoe is displaced to said extended position and each of said sensors generates said signal in a plurality of positions about said sleeve thereby mapping said position of said brake shoe.

6. The brake tester according to claim 5, wherein said sensors comprise laser sensors, said sleeve includes a plurality of circumferential slots each longitudinally aligned with a corresponding one of said sensors, said slots circumferentially extending about said sleeve substantially exposing said brake shoe to said sensor.

7. The brake tester according to claim 5, wherein said sensors comprise laser sensors, said sleeve includes an opening and a transparent member disposed therein substantially exposing said brake shoe to said sensor.

8. The brake tester according to claim 5, wherein said sensors are attached to a support bracket, said support bracket in turn secured to a bearing assembly disposed between said sleeve and said support bracket to facilitate smooth rotation about said sleeve.

9. The brake tester according to claim 8, wherein said bearing assembly comprises a first and second bearing ring spaced apart and connected by a plurality of bearing rods, said sensors being disposed between said bearing rings, a first and second bearing is mounted about said bearing rod one each adjacent each of said bearing rings and disposed within a first and second groove formed in the external surface of said sleeve, said driving means comprises a drive belt disposed in a groove formed on said first bearing ring.

10. A method of mapping a position of a brake shoe in a drum brake assembly mounted to a wheel spindle, said method comprising the steps of:

rotatably mounting a plurality of proximity sensors longitudinal spaced apart about said brake shoe and said spindle;

displacing said brake shoe from a retracted position to an extended position;

rotating said proximity sensors about said spindle;

recording a signal generated from each of said sensors representative of a distance between said brake shoe and said sensors in a plurality of circumferential positions; and compiling said recorded signals into a map representative of said position of said brake shoe.

11. A brake tester for mapping a position of a brake shoe in a simulated drum brake assembly, said tester comprising:

a means for measuring a distance between said brake shoe and a simulated brake drum liner along a plurality of longitudinal positions and generating a signal representative thereof;

a means for rotating said sensor means about said wheel spindle a plurality of revolutions;

a means for extending said brake shoe between a retracted position and an extended position; and a means for recording and compiling said signals to generate a map representative of said position of said brake shoe when in said extended position.

* * * * *